Nov. 20, 1945.  R. H. BARGE  2,389,125
FLUID METER
Filed Aug. 28, 1942
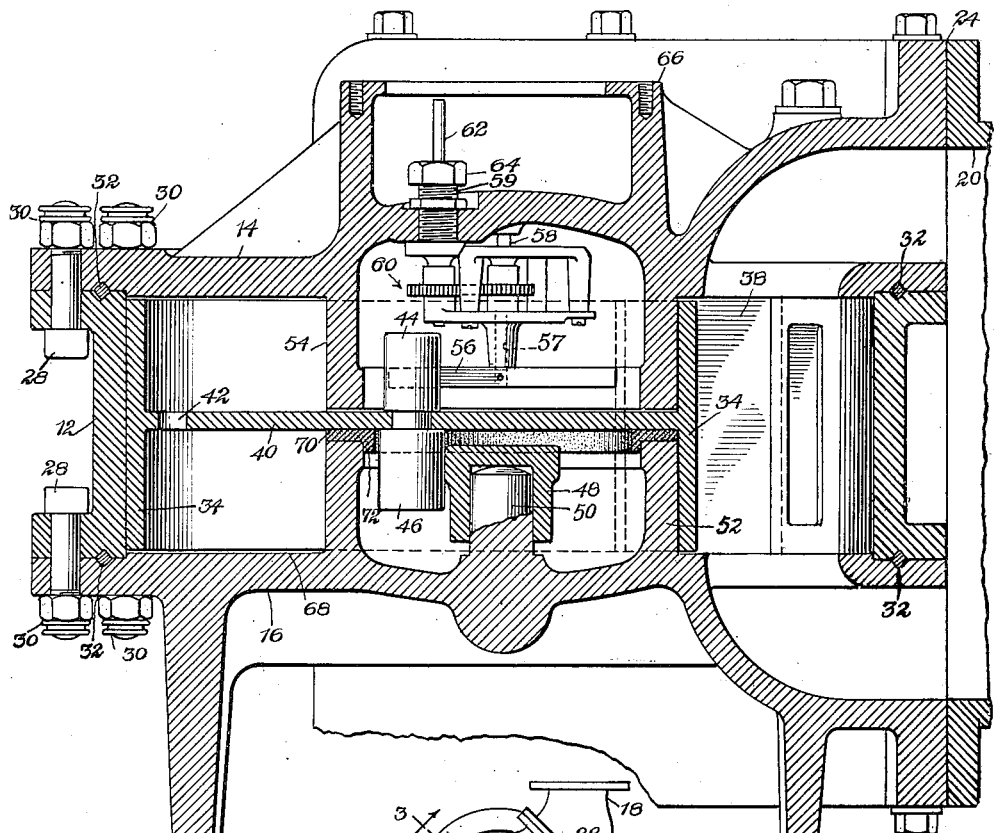
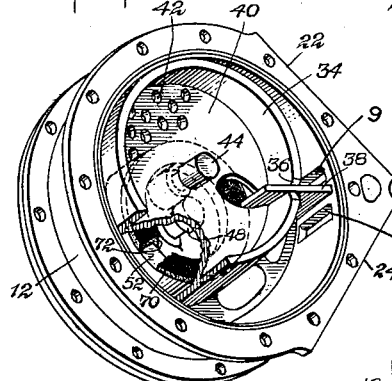
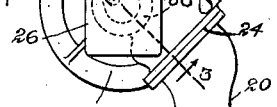
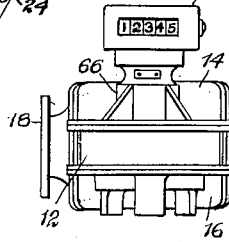
INVENTOR.
Raymond H. Barge
BY
James & Franklin
ATTORNEYS Patented Nov. 20, 1945

2,389,125

UNITED STATES PATENT OFFICE 2,389,125

FLUID METER

Raymond H. Barge, Mineola, N. Y., assignor to Pittsburgh Equitable Meter Company, Pittsburgh, Pa., a corporation of Pennsylvania Application August 28, 1942, Serial No. 456,464

7 Claims. (Cl. 121—68)

This invention relates to meters.

The primary object of my invention is to generally improve meters, particularly liquid meters of the oscillating piston type. The conventional meter of the oscillating piston type uses a generally cylindrical piston the bottom edge of which bears against the bottom wall of a generally cylindrical chamber of larger diameter. Difficulty has arisen with meters of large size, such as those used in bulk stations to handle petroleum products. A meter which is accurate over a range of, say, 30 to 300 gallons per minute, loses accuracy badly below 30 g. p. m., and may not even move at all for a flow below, say, five g. p. m. As a result, dishonest employees could steal quantities of gasoline or fuel oil by drawing the same at a very slow rate. In other cases the purchaser of the meter would want the same to maintain its accuracy at a flow rate lower than the usual 30 g. p. m. (for a 300 g. p. m. meter).

One specific object of my invention is to overcome the foregoing difficulties. I have found that with meters of this size the accuracy at slow flow rate is lost by reason of friction between the bottom edge of the piston and the bottom of the measuring chamber. In accordance with a feature of my invention, this friction is minimized by using a special bearing material at the point of contact. Preferred bearing materials are graphite, or a composition of powdered bearing metal and graphite, as for example, graphite impregnated with cadmium or with Babbitt metal. Bearings of this character are self-lubricating and acquire a very smooth, glassy surface.

To use the special bearing material for the entire piston would be very costly, not only because of the large quantity of the bearing material needed, but also because the piston is a difficult shape to mold and to machine or grind to accurate dimension. The bearing material might also be used for the bottom wall of the measuring chamber, but the amount of bearing material needed would still be substantial in quantity, and the shape would still be an odd and difficult one to make and to finish. This is so because the bottom wall is largely cut away by the inlet and discharge ports, and might have to be made in sections. In either case, difficulty would arise because of the relatively fragile nature of the material, both during manufacture, and during use, because of possible breakage under liquid hammer resulting from abrupt shut-off.

With my invention I provide a simple, annular bearing ring which is dimensioned to be received on and to act as the upper edge of the bottom head hub of the meter. I so dimension this bearing ring axially as to support the bottom of the web of the piston, thereby relieving the otherwise existing contact pressure between the bottom edge of the piston and the bottom of the measuring chamber. This construction minimizes the use of the special bearing material, and requires only a simple annular shape which is readily made by manufacturing procedures already used for standard bearings.

With my improvement, a 300 g. p. m. meter will respond to a flow rate as low as 1 g. p. m. or even less; the meter will be accurate within one per cent at a flow rate of, say, 10 g. p. m.

A further object of my invention is to so design the parts as to make it possible to convert meters already installed by a simple change which may be made in the field. For this purpose, the piston is designed with a web of reduced thickness, and the bearing ring is given a thickness substantially equal to the reduction in thickness of the web. Existing meters may thus be improved in the field by simply applying the bearing ring to the standard bottom head hub, and then substituting the new piston for the old piston.

To the accomplishment of the foregoing and such other objects as will hereinafter appear, my invention consists in the meter elements and their relation one to the other, as hereinafter are more particularly described in the specification and sought to be defined in the claims. The specification is accompanied by a drawing, in which:

Fig. 1 is a plan view of one form of bulk station meter;

Fig. 2 is a front elevation of the same;

Fig. 3 is a section through the meter taken approximately in the plane of the line 3—3 of Fig. 1;

Fig. 4 is a perspective view of the measuring chamber with the heads and flanged connections removed, the piston and the bearing ring each being partially broken away to expose the relation of the parts;

Fig. 5 is a perspective view of the bearing ring; and

Fig. 6 is a vertical section through the same, taken approximately in the plane of the line 6—6 of Fig. 5.

Referring to the drawing, and more particularly to Figs. 1 and 2, the particular form of bulk station meter here illustrated is that disclosed and claimed in a co-pending application of Alexander R. Whittaker, Serial No. 272,839, filed May 10, 1939. The meter body comprises a measuring chamber 12 having top and bottom heads 14 and 16 respectively, bolted thereto. Flanged inlet and outlet connections 18 and 20 are secured to the faces 22 and 24 of the meter body. These flanged connections may be changed in position to adapt them to various piping layouts, as is disclosed in the aforesaid application Serial No. 272,839. A register 26 is mounted at the top of the meter. The register shown is of the straight reading type, but other registers of the dial type may be equally well employed. Automatic tripping mechanism, ticket-printing mechanism, and other devices may be added, though not here illustrated.

Referring now to Fig. 3, it will be seen that the heads 14 and 16 are bolted to the chamber 12 by means of bolts 28 and nuts 30 which may be self-locking if desired. An annular round gasket material is compressed in the square channels at 32, thereby sealing the connection between the heads and the cylinder. While a specific measuring chamber structure is illustrated, it will be understood as the description proceeds that for purposes of the present invention the chamber may be made up in various ways without in any way affecting the invention.

Referring now to Figs. 3 and 4, the piston comprises a generally cylindrical side wall 34 cut away at 36 to straddle a stationary division plate 38 located radially of the measuring chamber between fluid inlet and outlet ports 9 and 10. In the particular meter here shown, there is a port on one side of the division plate through the bottom head divided by a rib or web, a similar divided port through the top head, and a port through the cylindrical chamber wall. Similar ports (not shown) are provided on the opposite side of the division plate. Other port arrangements may be employed, but in general, the inlet and outlet ports are separated by a division plate, which in turn is straddled by the oscillating piston.

The piston has a horizontal web 40 which is located approximately half-way between the top and bottom edges of the side wall 34. This web 40 may, if desired, be perforated over its entire area in order to equalize the pressure on both sides of the piston. In the drawing a few perforations 42 are shown, but these have not been drawn throughout the web, in order not to unduly complicate the drawing.

The web 40 carries a piston shaft 44 at its center. The piston shaft projects above and below the web. The downward projection 46 (Fig. 3) acts as a guide pin which moves about a piston roller 48 rotatably received on a piston roller pin 50. This in combination with the division plate 38 (Fig. 4) guides the piston for the desired oscillating movement. The guide pin 46 runs within a so-called "bottom head hub" 52 (Fig. 3) of conventional character. The hub is a generally cylindrical wall concentric with the main cylindrical wall 12 of the measuring chamber, but small enough in diameter to be received within the piston during the oscillating movement of the latter. In a similar way, the top head 14 has a downwardly projecting top head hub 54 which is aligned with the bottom head hub 52. The upper end 44 of the piston shaft revolves within the top head hub 54 and bears against a driving arm 56 secured at the lower end of a shaft 57 forming part of an intermediate gear train generally designated 60 and terminating in an intermediate upshaft 62. The intermediate is held at 59 and may be additionally located by a locating pin 58. An appropriate gland and packing nut 64 prevent leakage of liquid around the intermediate up-shaft 62. While not shown in Fig. 3, it will be understood that shaft 62 is connected to appropriate "change gears" which then drive the register or other equivalent mechanism, the latter being mounted on the neck portion 66 of the top head 14 of the meter.

In a conventional meter structure, the lower edge of the piston wall 34 rests on the bottom face 68 of the measuring chamber. This causes frictional resistance to movement of the piston, which leads to inaccuracy at low flow rate. In the case of a water meter, the piston is usually made of hard rubber, and the latter is light enough so that its immersion in the water minimizes the friction between the bottom of the piston and the bottom of the measuring chamber. Moreover, in measuring water, extreme accuracy is not essential.

However, meters intended to measure gasoline, fuel oil, or other petroleum products, cannot be made of rubber, and instead are made of metal. Even when using a comparatively light metal such as aluminum (with ten per cent copper to make the same machinable), the weight of the piston becomes a noticeable factor, especially in meters of large size and capacity. Furthermore, if the petroleum has more than one-half of one per cent sulphur content, it is considered corrosive, and in such case the piston must be made of a metal or alloy resistant to sulphur corrosion, such as "Monel," "Ni-Resist," or other such alloys. In these cases, the weight of the piston and consequently the frictional resistance to movement, are increased.

In accordance with the present invention, a special bearing material is disposed between the piston and the casing in order to minimize frictional contact. As here illustrated, a thrust bearing ring 70 is disposed at the top of the bottom head hub 52. This bearing 70 is so dimensioned axially or vertically as to bear against the bottom face of the web 40 of the piston and thus supports the weight of the piston and provides a running clearance as shown in Fig. 3 at 68 on an exaggerated scale for the sake of clarity. In practice, the clearance at the bottom and at the top may be only a matter of a thousandth of an inch. No problem of leakage or inaccuracy of the meter arises because even with the piston resting on the bottom of the measuring chamber, there would be a clearance at the top of about two-thousandths of an inch, and two narrow passages will result in even less leakage than a single wider passage.

The specific bearing here shown has a locating flange 72 dimensioned to fit within the bottom head hub 52, thus accurately centering the bearing. The periphery of the bearing is notched at 74 to conform with a vertical groove cut on the outside of the top and bottom head hubs 52 and 54, which aligned grooves receive the inner edge of the division plate 38. The notch 74 fits around the inner edge of the division plate, preventing rotation of the bearing. Except for the notch 74, the bearing is a simple, annular shape which is readily molded and machined or ground by conventional methods already known and used by companies specializing in the manufacture of bearings of this character. Because of the simple shape of the bearing and the small amount of material required for the same, it is relatively inexpensive. It is well supported and is not subject to breakage even if fragile.

The bearing is preferably an oilless bearing, and many of the known types of oilless bearings may be used, such as bronze impregnated with graphite. The bearing may also be made of compressed, molded graphite, or it may be made of graphite impregnated with a bearing metal, or more specifically, graphite impregnated with cadmium or with Babbitt metal. For hot liquids, cadmium would be preferable to Babbitt metal because of the low melting point of the latter.

The carbon or graphite type of bearing has the advantage of resisting high temperature and of having substantially no coefficient of expansion. A carbon or graphite bearing may be used not only for water, oil, gasoline, etc., but also for some acids.

For some cold liquids, the bearing might be made wholly of Babbitt metal, but I do not strongly recommend such a construction because the Babbitt metal is relatively soft. The graphite, or carbon and metal bearings are not only self-lubricating, but soon acquire a remarkably smooth, glassy surface. The wear of the carbon or graphite and metal bearing is very slight, and this is desirable not only from the standpoint of long life, but also because it somewhat simplifies the problem of tolerances in manufacturing the piston. The reason for this is that if the bottom of the piston happens to contact the bottom of the measuring chamber when first installed, the metal at the lower edge of the piston will wear away slightly, while the bearing will not, and consequently the meter will run itself into the desired condition in which the weight of the piston is taken at the bearing, and not at the bottom edge of the piston wall.

In order to make standard meters convertible to the improved meter, out in the field as a simple repair job, I prefer to make the piston web 40 of a replacement piston thinner than the web of the piston to be replaced, the reduction in thickness being made on the underside of the centerline of the piston and being substantially equal to the desired thickness of the bearing 70. With this arrangement, a meter may be converted in the field without changing the measuring chamber by simply removing the old piston, applying the bearing 70 to the top of the bottom head hub 52, and then adding the new piston.

It is believed that the construction and operation, as well as the advantages of my improved meter, will be apparent from the foregoing detailed description. It will also be apparent that while I have shown and described the invention as applied to one specific form of oscillating piston meter, the invention may equally well be applied to other forms of oscillating piston meters. It will therefore be apparent that while I have shown and described my invention in a preferred form, many changes and modifications may be made in the structure disclosed, without departing from the spirit of the invention as sought to be defined in the following claims.

I claim:

1. A meter of the oscillating piston type comprising a generally cylindrical measuring chamber, said chamber having top and bottom heads and having inlet and outlet ports with a division plate therebetween, the bottom head of said chamber having a bottom head hub within said chamber, a piston having a generally cylindrical side wall with a web extending thereacross, and a thrust bearing ring received by and acting as the top edge of the bottom head hub, said ring being of unctuous material slidably engaged by the bottom of the web and supporting the piston in spaced relation to the bottom head with a running clearance.

2. A meter as defined in claim 1, in which the web of the piston is thinned by elimination of material at the bottom thereof for a desired thickness substantially equal to the axial thickness of the bearing ring, whereby existing meters may be improved in the field by applying the bearing ring and a new piston to the existing meter installation.

3. A fluid meter of the oscillating piston type comprising a generally cylindrical measuring chamber having inlet and outlet ports with a division plate therebetween, a hub upstanding from the bottom wall of said chamber, a piston having a generally cylindrical side wall with an intermediate lateral web, and a thrust bearing ring on the top edge of the said hub engaging the bottom of said web and supporting said piston in spaced relation to said chamber bottom wall, said piston web being thinned by elimination of material at the bottom thereof for a desired thickness substantially equal to the axial thickness of the bearing ring, whereby existing meters may be improved in the field by applying the bearing ring and a new piston to the existing meter installation.

4. A fluid meter comprising a measuring chamber, a stationary hub in said chamber, a self lubricating bearing member mounted on said hub and having a flat piston supporting face, a piston in said chamber adapted for oscillation in response to fluid flow, and a web on said piston having a flat lower face slidingly contacting the corresponding flat supporting face on said bearing member, said piston being supported solely by and entirely upon said bearing member in spaced relation to the bottom of said chamber with a running clearance during said oscillation.

5. A fluid meter comprising a measuring chamber, a hollow stationary upstanding hub member within said chamber, a self lubricating bearing ring mounted on the inner end of said hub so as to be held against radial displacement, a piston within said chamber, a web on said piston coextensive with said bearing ring, said piston being adapted to oscillate substantially horizontally within said chamber in response to fluid flow with said web slidably supported by said bearing ring, and cooperating means on said piston and within said hub for guiding said oscillation, said piston being supported entirely by said bearing ring in spaced relation to the bottom of said chamber with a running clearance.

6. In a fluid meter of the oscillating piston type, a generally cylindrical measuring chamber having a fluid inlet port in its bottom wall, an upstanding stationary bottom hub in said chamber, a self-lubricating bearing element supported on the upper end of said hub within said chamber and having an upwardly facing planar piston supporting surface of appreciable area, and a piston within said chamber having an intermediate horizontal web formed with a flat surface adapted to rest upon and slide over said piston supporting surface and having a peripheral rim for association with the cylindrical side walls of the measuring chamber, said piston being supported entirely by said bearing element with the bottom of said rim being maintained in running clearance spaced relation to the bottom wall of the measuring chamber during normal horizontal oscillation of the piston.

7. In the fluid meter defined in claim 6, said hub comprising a hollow annular part rigid with said bottom wall, and said bearing element comprises a pre-formed annulus adapted to seat on the top of said hub and having a downwardly projecting flange extending within said hub for readily locating said bearing element and preventing its displacement laterally from the hub during oscillation of the piston.

RAYMOND H. BARGE.